US007208133B2

(12) United States Patent
Cho et al.

(10) Patent No.: US 7,208,133 B2
(45) Date of Patent: Apr. 24, 2007

(54) METHOD FOR THE PREPARATION OF IV-VI SEMICONDUCTOR NANOPARTICLES

(75) Inventors: Kyung-Sang Cho, Kwacheon (KR); Wolfgang Gaschler, Ludwigshafen (DE); Christopher B. Murray, Ossining, NY (US); Dmitri Talapin, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 10/994,944

(22) Filed: Nov. 22, 2004

(65) Prior Publication Data

US 2006/0110313 A1    May 25, 2006

(51) Int. Cl.
*C01B 19/00* (2006.01)
*C01B 17/00* (2006.01)
*C01G 17/00* (2006.01)
*C01G 21/00* (2006.01)
*C01G 19/00* (2006.01)

(52) U.S. Cl. .................. 423/508; 423/509; 423/561.1; 423/618; 423/619; 423/344; 423/89; 423/92; 438/46; 438/77; 438/483; 977/813; 977/814; 977/773; 977/774; 977/775

(58) Field of Classification Search ............... 977/813, 977/814, 773, 774, 775; 438/46, 77, 483; 423/508, 509, 561.1, 618, 619, 344, 89, 92
See application file for complete search history.

(56) References Cited

U.S. PATENT DOCUMENTS 6,106,609 A * 8/2000 Yang et al. .................. 117/11
6,424,004 B2 * 7/2002 Kim et al. ................... 257/321
6,878,446 B2 * 4/2005 Inaoka ........................ 428/407

OTHER PUBLICATIONS

C. B. Murray "Colloidal synthesis of nanocrystals and nanocrystal superlattices" IBM J. Res. & Dev. vol. 45, No. 1, Jan. 2001, pp. 47-56.*

Edward H. Sargent "Infrared Quantum Dots" Advanced Materials vol. 17, No. 5, Mar. 8, 2005, pp. 515-522.*

K. K. Nanda et al. "Band-gap tuning of PbS nanoparticles by in-flight sintering of size classified aerosols" Journal of Applied Physics vol. 91, No. 4, Feb. 15, 2002, pp. 2315-2321.*

A. Lipovskii et al. "Synthesis and characterization of PbSe quantum dots in phosphate glass" Appl. Phys. Lett. vol. 71, No. 23, Dec. 8, 1997, pp. 3406-3408.*

A. Olkhovets, et al., "Size-Dependent Temperature Variation of the Energy Gap in Lead-Salt Quantum Dots", Physical Review Letters, The American Physical Society, vol. 18, No. 16, pp. 3539-3542 (1998).

Steven A. McDonald, et al., "Solution-Processed PbS Quantum Dot Infrared Photodetectors and PhotoVoltaics", Advance Online Publication, pp. 1-6, (2005).

A.D. Andreev, et al., "Anisotropy-induced Optical Transitions in PbSe and PbS Spherical Quantum Dots", Physical Review B, The American Physical Society, vol. 59, No. 23 (1999).

K. Alchalabi, et al., "Self-Assembled Semiconductor Quantum Dots with Nearly Uniform Sizes", Physical Review Letters, The American Physical Society, vol. 90, No. 2 (2003).

* cited by examiner

*Primary Examiner*—Timothy C. Vanoy
(74) *Attorney, Agent, or Firm*—Scully, Scott, Murphy & Presser, P.C.; Ido Tuchman, Esq.

(57) ABSTRACT

A high temperature non-aqueous synthetic procedure for the preparation of substantially monodisperse IV-VI semiconductor nanoparticles is provided. The procedure includes introducing a first precursor selected from the group consisting of a molecular precursor of a Group IV element and a molecular precursor of a Group VI element into a reaction vessel that comprises at least an organic solvent to form a mixture. Next, the mixture is heated and thereafter a second precursor of a molecular precursor of a Group IV element or a molecular precursor of a Group VI element that is different from the first is added. The reaction mixture is then mixed to initiate nucleation of IV-VI nanocrystals and the temperature of the reaction mixture is controlled to provide nanoparticles having a diameter of about 20 nm or less.

30 Claims, 10 Drawing Sheets

METHOD FOR THE PREPARATION OF IV-VI SEMICONDUCTOR NANOPARTICLES

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of DARPA Grant No. DAAD19-99-1-0001 awarded by the Army Research Office.

FIELD OF THE INVENTION

The present invention relates to semiconductor nanoparticles (nanocrystals), and more particularly to an improved method for the preparation of IV-VI semiconductor nanoparticles, i.e., quantum dots. More specifically, the present invention provides an improved, high temperature non-aqueous synthetic method for the preparation of substantially monodispersed IV-VI semiconductor nanoparticles with controlled composition shape and surface stabilization.

BACKGROUND OF THE INVENTION

Lead chalcogenide nanoparticles are a family of IV-VI nanoparticles that are of particular interest due to their size tunable optical and emission properties at wavelengths between 1 micron and 3 microns for a variety of applications including, for example, optoelectronics, thermoelectric solid state cooling and power generation, infrared imaging as well as biological applications. In addition, conventional lead chalcogenide semiconductor powders (micron scale) are used extensively in the production of thermo-electric devices, and nanostructured analogs of these materials have been suggested to have potential benefits in performance.

Several methods for the preparation of lead chalcogenide semiconductor quantum dots currently exist, but each has significant deficiencies that have limited the development technologies based on these materials. High temperature growth of lead chalcogenide semiconductor nanocrystals is performed in borosilicate glasses by adding salts of lead and Group VI elements to a glass forming matrix and then heating the mixture above its melting point and homogeneously dissolving the salts of lead and the Group VI elements. The molten mixture is then cooled to a temperature at which the lead cation, $Pb^{+2}$ and the chalcogenide anion, $E^{-2}$ become supersaturated and nanocrystals of the lead chalcogenide (hereinafter PbE) nucleate and grow throughout the glass matrix. Further annealing of the samples over periods of days to weeks with careful adjustments in temperature and time of exposure can be used to coarsely adjust nanocrystal size.

The nanocrystals that are formed using this prior art procedure are of good crystal quality and can display sharp optical features in absorption (although emission is usually very poor). Unfortunately, these prior art nanocrystals are trapped in the glass matrix and cannot be extracted for further purification or modification. Moreover, the presence of the insulating glass matrix precludes electrical contact to the nanocrystals, which greatly limits their use in electronic applications.

A second class of synthetic procedures for the production of IV-VI nanocrystals, which occurs at, or near, nominal room temperature, uses the precipitation of PbE salts in an aqueous solution containing at least one surfactant or a mixture of water, an organic solvent and a surfactant. Alternatively these "room temperature preparations" employ a lead salt and use a gaseous reactant for the chalcogenide source (e.g., $H_2S$, $H_2Se$, or $H_2Te$). In all cases, the room temperature syntheses have proven to be unsatisfactory due to relatively poor control of particle size and poor crystallinity of the resulting particles. Furthermore, the prior art methods that employ gas phase reactants are undesirable due to the extreme toxicity of these reactants and significant cost included in their safe handling and disposal.

A third class of techniques for the preparation of lead chalcogenide nanocrystals (quantum dots) involves gas phase condensation of the evaporated or laser ablated material. These gas phase techniques provide nanocrystals of high purity and crystallinity, but lack the ability to produce monodisperse samples at the levels of 20% standard deviation in size or below in the raw stream. As the gas phase techniques generally produce tens of micrograms to a few milligrams further separation of the material is not practical.

In view of the above drawbacks with prior art synthetic procedures for the preparation of lead chalcogenides and other IV-VI semiconductor nanoparticles, there is a need for providing a new and improved synthetic procedure for preparing IV-VI semiconductor nanoparticles which permits control of the nanoparticle composition, size, shape and surface derivatization, while maintaining high materials yield and allows scale up to large quantities. By controlling the aforementioned features of the semiconductor nanoparticles, the electronic and chemical properties of the nanoparticles can be optimized.

SUMMARY OF THE INVENTION

The present invention provides an improved, high temperature (on the order of about 90° C. or above) non-aqueous synthetic procedure for the preparation of substantially monodisperse IV-VI semiconductor nanoparticles (quantum dots). The term "substantially monodispersed" is used in the present application to denote nanoparticles that are uniform in size to better than a 10% standard deviation (std) in diameter and optimally uniform to approximately 5% std in diameter, while maintaining a substantially uniform shape. The present invention permits control of nanoparticle composition, size, shape and surface derivatization, which in turn allows the electronic and chemical properties of the nanoparticle to be optimized.

The synthetic procedure of the present invention does not utilize a gas phase chalcogenide reactant. Instead, solutions of precursors for both the IV source and the VI source are utilized in the present invention.

The term "IV-VI semiconductor nanoparticles" is used in the present application to denote nanoparticles that include an element from Group IV of the Periodic Table of Elements, i.e., C, Si, Ge, Sn or Pb, and one or more chalcogenides from Group VI of the Periodic Table of Elements, i.e., O, S, Se, Te and Po. More specifically, the semiconductor nanoparticles of the present invention can be designated as having the following simple notation: AB wherein A is an element from Group IV of the Periodic Table of Elements, and B is at least one chalcogenide from Group VI of the Periodic Table of Elements.

In one embodiment of the present invention, which is highly preferred, A is Pb, and B is S, Se, Te or a mixture thereof. In this embodiment, lead chalcogenide nanoparticles are made.

The present invention includes a series of well-defined solution phase (colloidal) synthetic procedures for the preparation and purification of IV-VI nanoparticles. These nanoparticles are synthesized by rapidly mixing a room temperature solution of a Group VI precursor with a hot solution of a Group IV precursor in the presence of at least one stabilizer. The foregoing order of addition of reactants is preferred, but the present invention also contemplates the reverse order of addition. In addition, a good quality product may be isolated from a reaction where the Group VI and Group VI and stabilizer, i.e., surfactant, have been mixed at near ambient temperature (10°–40° C.) at which the reaction between the two reagents is slow. The combined solution may then be introduced into a hot growth medium rapidly accelerating the reaction and achieving the necessary nucleation and subsequent growth of the nanoparticles. Finally, all reagents may be mixed at room temperature and stirred as the reaction is rapidly heated (greater that 1° C. per minute) allowing the nucleation and formation of nanoparticles. The preferred embodiment of the present invention contemplates adding a room temperature solution (20°–30° C.) of a Group IV precursor to a hot solution (90° C. or above) of a Group VI precursor, as this has proven to provide the greatest control of nucleation events and yielded the best overall sample quality as measured by size and shape uniformity and the precision with which a particular particle size can be targeted.

In the preferred embodiment, the Group VI precursor is introduced to a heated mixture that includes a high boiling solvent and a Group IV precursor and amphiphilic stabilizers ideally a mixture of long chain carboxylic acid and long chain amine (secondary amines and tertiary amines may be used, although best results were obtain for primary amines as co-stabilizers). Upon introduction of the Group VI precursor into the heated mixture and subsequent mixing, small nanocrystals (on the order of less than about 2 nm, preferably less than about 1 nm) of the IV-VI elements nucleate and begin to grow, even as the solution temperature drops below the initial temperature of the hot solution due to the addition of the room temperature reagent, i.e., the Group VI precursor. This drop in temperature has the beneficial consequence of slowing the reaction of the precursors and reducing the chemical driving force for the nucleation of new particles. This limits the time window over which nuclei are formed and contributes to the narrow initial distribution in particle size. Raising the solution temperature accelerates the nanocrystal growth rate and higher temperatures, after the initial nucleation event, allow materials to be deposited on the existing nuclei and continued heating can then be used to prepare large size nanocrystals. Growth will continue after nucleation by first consuming the remaining precursors that were not expended in the formation of the nuclei after the reagent concentration is reduced sufficiently a secondary growth mechanism "Ostwald Ripening" contributes to the increase in the average size of the particles.

This process progressively transfers material from the smallest particles in the distribution to larger particles ultimately leading to the complete dissolution of some of the smaller particles and a population with a decreased number density, but larger average size. Rather than relying on the slower pace of Ostwald ripening, it is also possible to add additional Group VI and Group IV precursors to the solution containing existing nanoparticles and thus extend the growth of the existing particles. Care must be taken not to introduce the reagents to rapidly or at high temperature above 150° C., as this would promote the nucleation of a second population of nanoparticles and thus compromise the size distribution of the sample.

Solution temperatures of about 90° to about 220° C. are used in the present invention to tune the size of IV-VI nanocrystal samples from about 3.5 nm to about 20 nm in diameter while keeping the growth time short. Typically, IV-VI nanocrystal samples can be isolated from solution within about 15 minutes of the precursor addition. Alternatively larger particle can be produced over a longer time by growing more slowly at a lower temperature. For example, samples approaching 15 nm could be isolated for a growth solution held at approximately 150° C. over a 6 hr period. It was found that the modulation of the temperature provides an effective means of producing a range of particle sizes while maintaining higher throughput (more sample as measure by mass per unit time).

It is noted that the reagents employed in the present invention preferably are dried prior to use so as to remove excess moisture therefrom. A moisture content of about 0.5% or less, preferably below 0.1%, is desirable in the present invention. Applicants have unexpectedly found that a high moisture content that is above the ranges mentioned above results in nanoparticles whose physical properties, such as size and shape, vary from one reaction to another. Careful control of the moisture content within the inventive reaction provides reproducible results from one run to another. Specifically, an uncontrolled water content leads to two seriously detrimental effects. First, the nucleation rate from reaction to reaction with varying water content varies and thus this introduces irreproducibility in the control of particle size. Secondly, it is noted that a moisture content above 0.5% can result in a sharply lower yield for the reaction; a decrease by as much as 10 fold were observed when careful drying of the reagents and solvents was omitted. Optimal drying of solvents can most easily be achieved by heating the solvent or a mixture of the Group IV precursor and solvent to temperature of 200° C. or greater under a reduce pressure of 10 Torr or less for a period of 30 minutes or greater. Alternatively, chemical drying can be achieve though the addition of an anhydride of the carboxylic acid stabilizer. For example, utilizing oleic anhydride instead of oleic acid has the benefit that the each oleic anhydride molecule will scavenge an equal molar quantity of water yielding two oleic acid molecules which may then participate as stabilizers.

Specifically, and in broad terms, the method of the present invention comprises the steps of:

introducing, in the presence of at least one stabilizer, a first precursor selected from the group consisting of a molecular precursor of a Group IV element and a molecular precursor of a Group VI element into a reaction vessel that comprises at least an organic solvent to form a mixture;

heating the mixture to a temperature of about 90° C. or above;

adding, in the presence of said at least one surfactant, a second precursor which is different from the first precursor and is selected from the group consisting of a molecular precursor of a Group IV element and a molecular precursor of a Group VI element into the heated mixture;

mixing the mixture to initiate nucleation of IV-VI nanocrystals; and controlling the temperature of the nanocrystals to provide substantially monodispersed IV-VI nanoparticles having a diameter of about 20 nm or less.

In a preferred embodiment, the at least one stabilizer comprises a mixture of a carboxylic acid and a primary alkyl amine.

In a preferred embodiment of the present invention, the first precursor is a molecular precursor of a Group IV element, especially Pb, and the second precursor is a molecular precursor of a Group VI chalcogenide, especially Se.

The materials produced through the method of the present invention are more controlled in size, shape, composition and thus more predictable in properties than materials prepared by any existing method. Further, the yield of material isolated exceeds that previously reported. Moreover, the nanoparticles of the present invention are of a higher crystal quality than those obtained using prior art methods. That is, the nanoparticles produced using the method of the present invention have a purity of about 99% PbSe or greater for the inorganic content after isolation. Depending of the reaction conditions, it is possible to synthesis nanoparticles that are spherical, cubic, octahedral, star-shaped or any mixture thereof.

The reagents employed in the present invention are inexpensive and the procedures are scalable to commercial quantities. The nanoparticles of the present invention can be isolated, purified and/or intentionally modified by simple synthetic techniques, such as precipitation in a solvent/nonsolvent pair and centrifugation, because that are not trapped in a glass matrix, as in the case with some of the prior art processes discussed above.

BRIEF DESCRIPTION OF THE DRAWINGS

FIG. 1A shows spherical particles, FIG. 1B shows cubic particles, FIG. 1C shows octahedral particles, and FIG. 1D shows star-shaped particles.

FIG. 2A shows spherical particles, while FIG. 2B shows cubic particles.

FIG. 3A shows spherical particles, while FIG. 3B shows cubic particles.

DETAILED DESCRIPTION OF THE INVENTION

Figure 1A:
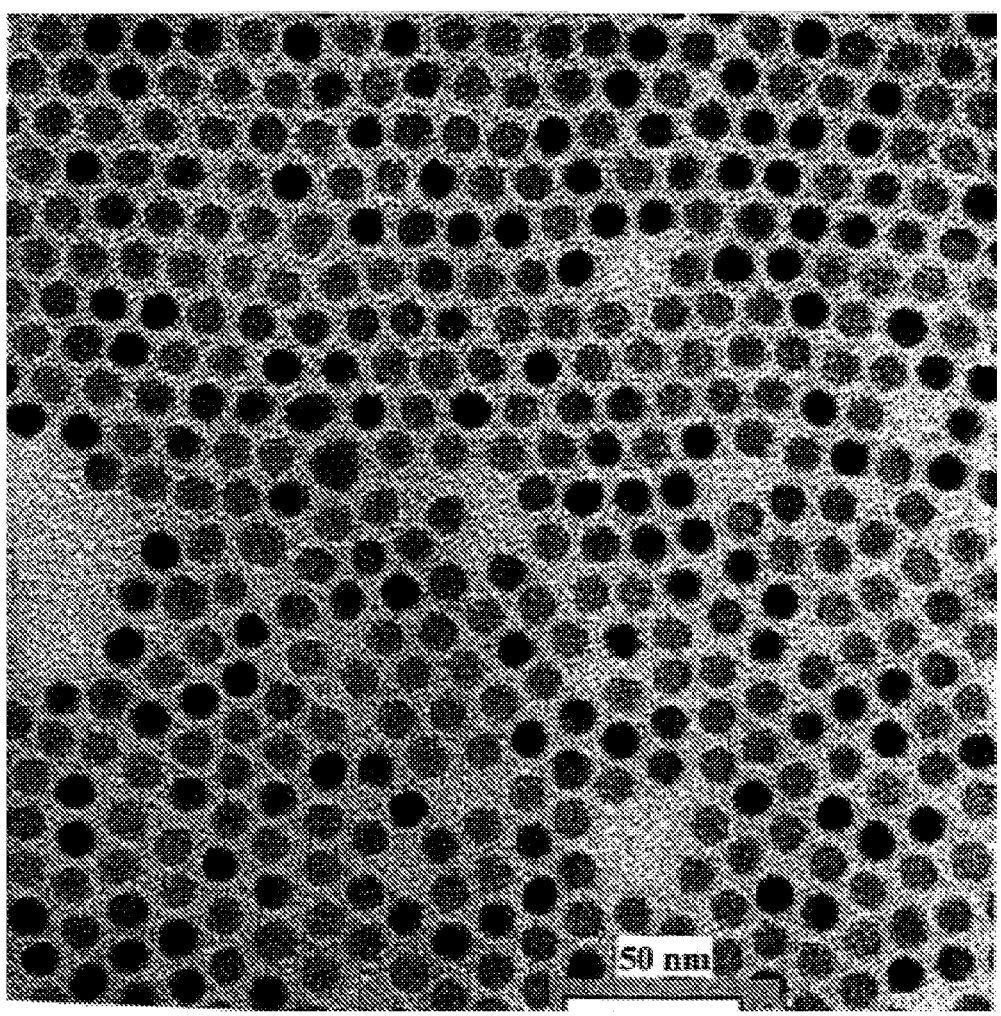
FIGS. 1A–1D are micrographs of PbSe nanoparticles of the present invention showing different crystal shapes of the PbSe nanoparticles.
Figure 1B:
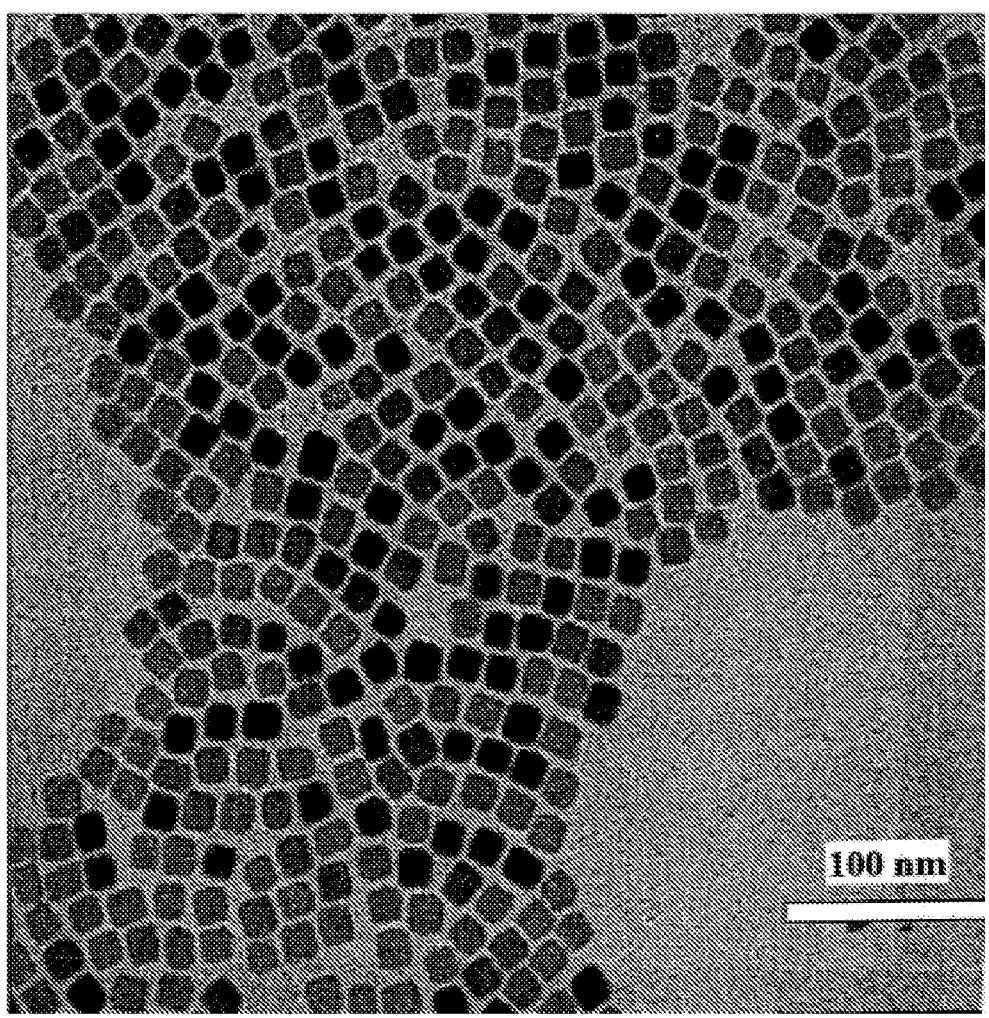
Figure 1C:
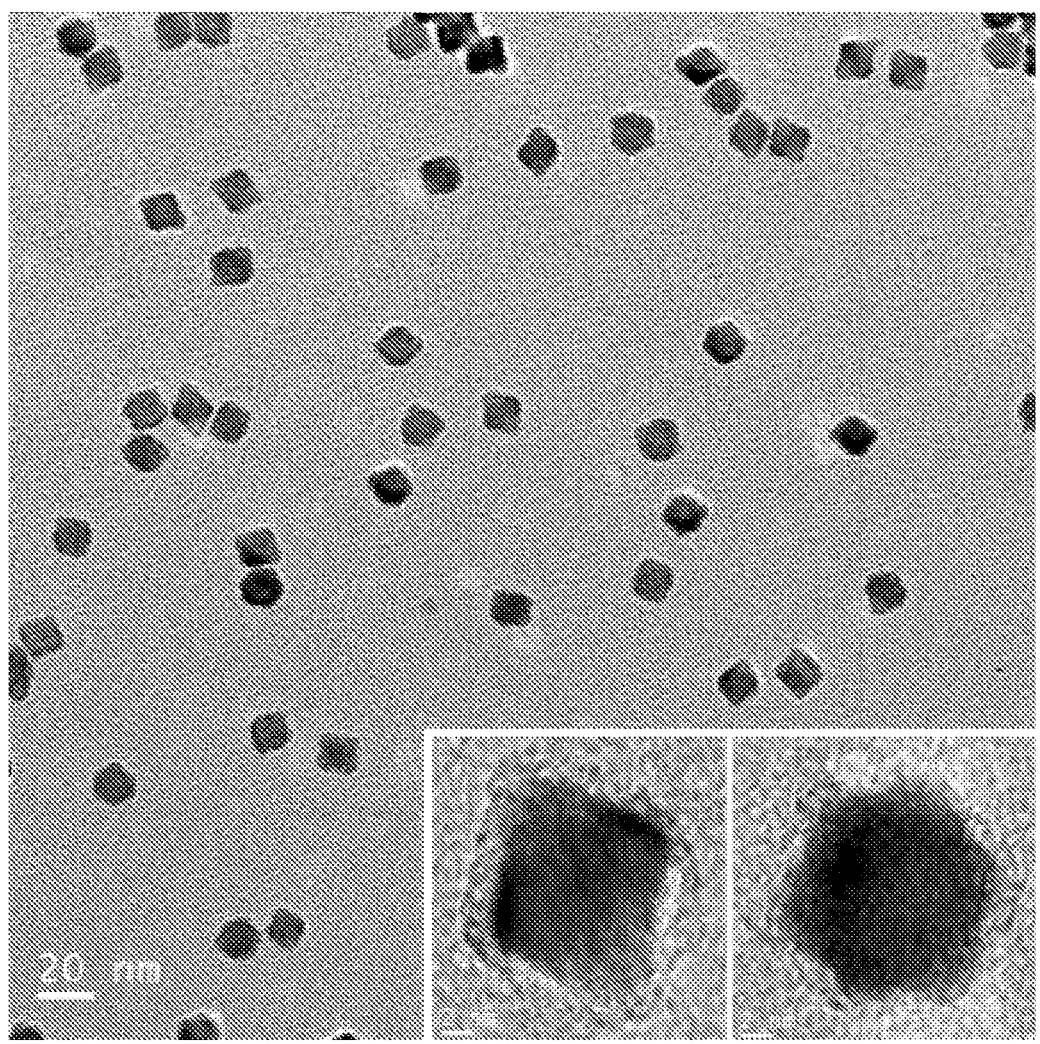

As stated above, the present invention provides a synthetic procedure for the preparation of substantially monodispersed IV-VI nanoparticles. The synthetic procedure of the present invention is performed at high temperatures (on the order of about 90° C. or greater) using a non-aqueous medium. The term "non-aqueous" denotes that the preparation of the IV-VI nanoparticles occurs substantially in the absence of any water; the term does not, however, preclude the possibility of small quantities of water (0.1% or less) that may form in-situ during nanoparticle formation. It should be noted however that the presence of water can alter the reaction rate. It is highly preferred that all extraneous water be removed from the precursor solutions and solvent prior to initiating the reaction. Uncontrolled water content will lead to a loss in the precision with which a particular particle size range can be targeted and an overall reduction in yield. Further, it should be noted that all reactions are carried out under an inert atmosphere using standard air free handling techniques. Typically, nitrogen, argon, helium, or carbon dioxide (unreactive for these conditions) can be used, with nitrogen being more typical.

In accordance with the present invention, a chemical solution based procedure to synthesize surface passivated VI-VI nanoparticles is provided. In accordance with the present invention, two precursor molecules are introduced into an organic solvent to form IV-VI nanocrystals. The reaction is typically mediated by compounds that contain stabilizing molecules, i.e. surfactants, that can be added separately as additional components. It is observed that the terms "stabilizing compounds", "stabilizer" and "surfactant" are interchangeably used in the present application. The compounds containing the stabilizing molecules, which are able to bind reversible to the nanoparticle surface, control the growth kinetics and prevent aggregation due to their bulkiness. Formation of bulk IV-VI is however observed in the present application without stabilizers present.

The approach to use metallorganic precursors (see, for example, S. M. Stuczynski, J. G. Brennan, M. L. Steigerwald, *Inorg. Chem.* 28, 4431 (1989)) and surface passivating groups was shown to produce high quality II-VI and III-V semiconductor nanocrystals with control of size and also shape of the particles (see, for example, C. B. Murray, D. J. Norris, M. G. Bawendi, *J. Am. Chem. Soc.* 115, 8706 (1993), and O. I. Micic, C. J. Curtis, K. M. Jones, J. R. Sprague, A. J. Nozik, *J. Chem. Phys.* 98, 4966 (1994))

In accordance with a first step of the present invention, a first precursor of either a molecular precursor of a Group IV element or a molecular precursor of a Group VI element (e.g., a chalcogenide) is introduced into a reaction vessel that contains at least an organic solvent and optimally a long chain amphiphilic stabilizer so as to form a mixture containing the first precursor and the organic solvent.

The reaction vessel employed in the present invention includes any reaction vessel that includes means for mixing, means for monitoring and controlling the temperature of reactants within the reaction vessel, and means for introducing liquid reactants into the reaction chamber. The reaction vessel may be a batch reactor, or it may be a large scale reactor. One example of a reaction vessel that can be employed in the present invention is a three-neck flask that includes a stirring bar, a thermometer, a liquid sample injection port and a reflux tube. The temperature of the flask is controlled by a heater that is typically positioned beneath the flask or wrapper around the flask. An immersion of the flask in a high boiling oil bath or sand bath may also be utilized to transfer heat to the vessel. The heater may also include a means for adjusting the speed of the stirrer.

The organic solvent that is employed in the present invention is any organic solvent that is inert to (i.e., does not react with) the IV/VI precursor compounds, yet has a high boiling point that is on the order of about 100° C. or above. Illustrative examples of organic solvents that can be used in the present invention include, for example, alkanes, alkenes, alkynes, alcohols, ethers containing from 10 to about 22, preferably from about 16 to about 22, carbon atoms, and mixtures thereof.

The organic solvent, as well as the other reagents used in the present invention, is typically dried prior to use to remove excess water from the solvent. Any drying process that is capable of removing excess water from a reagent, such as the organic solvent mentioned above, can be used in the present invention. A water content of less than 0.5% is tolerable, but a water content of 0.1% or below is preferred since the use of low water content reagents provides nanoparticles whose size and shape is reproducible.

The organic solvent employed in the present invention should have a purity of at least about 99, with a purity from about 99.9 or greater being more highly preferred. In particular anhydrous solvents are preferred. The desired purity may be available from a supplier or alternatively the organic solvent can be purified to remove water and other contaminants prior to its use. If a purification step is performed, any known solvent purification process well known to those skilled in the art can be employed.

A first precursor is then added to the reaction vessel containing the organic solvent. The first precursor can be either a molecular precursor of a Group IV element or a molecular precursor of a Group VI element. In a preferred embodiment of the present invention, the first precursor is a molecular precursor of a Group IV element. More preferably, the first precursor is a lead salt, such as lead acetate.

The addition of the first precursor typically occurs at nominal room temperature with continuous stirring. The term "nominal room temperature" denotes a temperature from about 10° to about 40° C. The first precursor may be added to the organic solvent using a single injection or the first precursor may be added dropwise. The addition of the first precursor to the organic solvent and the remaining additions and reactions are typically performed in the presence of an inert gas ambient such as, for example, He, Ar, $N_2$, $CO_2$ (inert under these conditions) or a mixture thereof.

The term "molecular precursor of a Group VI element" is used herein to denote a metalorganic complex of the formula $R'_3PB$ wherein $R'$ is an alkyl containing from about 1 to about 22, preferably from about 1 to about 12, carbon atoms, and B is at least one of O, S, Se, Te or P. Alternatively precursors solution for S, Se, and Te can be prepared by dissolving the elemental S, Se, or Te into primary amines (in the case of Se, Te, heating is required to produce the solutions). A precursor solution for S, Se, Te can also be prepared by bubbling $H_2S$, $H_2Se$, or $H_2Te$ though the solvent ideally also in the presence of a primary amine.

Dialkyl selenides, and dialkyl tellurides may also be employed, although the dialkyl sulfides appear unreactive under these conditions. Ditellurium alkylphosphoramides, selenium alkylphosphoramides and sulfur alkylphosphoramide may also be considered. A final class of Group VI precursors which can be used are the bis-trimethylsilyl chalcogenides having the formulas $(CH_3)_6Si_2E$ where E=S, Se or Te. A highly preferred molecular precursor for sulfur is elemental sulfur dissolved in a primary amine, the preferred selenium precursor that is employed in the present invention is trioctyl- or tributyl- phosphine selenide, while tellurium hexaethylphosphorus triamide constitutes the preferred tellurium precursor.

The term "molecular precursor of a Group IV element" is used herein to denote a salt of a Group IV element. Illustrative examples of molecular precursors of a Group IV element that can be employed in the present invention include, but are not limited to:-lead precursors. Examples of lead precursors include elemental lead, lead nanocrystals, lead (II) acetate, lead (II) oxide, lead (II) carbonate, lead (II) chloride, lead (II) stearate, lead (II) oleate, lead (II) acetylacetonate, lead (II) acrylate, lead (IV) oxide, lead (IV) acetate, tetraphenyl lead, lead oxalate, lead alkoxides, lead bromide, or lead iodide. A highly preferred molecular precursor of a Group IV element is lead acetate $(Pb(OAc)_2)$ which is in turn converted in situ to a longer chain lead carboxylate by heating in solution under vacuum with a longer chain carboxylic acid allowing extraneous water and acetic acid to be distilled out of the reaction.

The amount of the Group VI precursor added to the organic solvent may vary depending on the size of the reactor as well as the desired nanoparticle yield. Typically, and for a batch reactor, from about 10 millimoles to about 100 millimoles, of the Group VI precursor solution is added to 100 ml of organic solvent. More typically, from about 30 to about 50 millimoles of the Group VI precursor solution, is added to 100 ml of organic solvent.

At this point of the present invention or prior to the addition of the first precursor, a surfactant or mixture of surfactants can be introduced into the reaction vessel. The surfactant employed in the present invention is preferred to include a low moisture content of less than 0.5%, preferably 0.1% or below. The low water content is achieved by drying the surfactant prior to use. The surfactants employed in the present invention are capable of serving as a passivation layer for IV-VI nanocrystals that are subsequently formed in the present invention.

Suitable surfactants that can be employed in the present invention include aliphatic carboxylic acids having from 1 to about 22, more preferably from about 1 to about 12, carbon atoms. Illustrative examples of aliphatic carboxylic acids that can be employed in the present invention include, for example, caprylic acid, capric acid, lauric acid, myristic acid, palmitic acid, stearic acid, oleic acid, linoleic acid, and other like aliphatic carboxylic acids, including mixtures thereof. Preferred aliphatic carboxylic acids that are employed as the surfactant of the present invention include, stabilizing (i.e., capping) ligands.

Some other nonlimiting examples of stabilizers that can be employed in the present invention include: Fatty carboxylic acids (such as lauric, myristic, palmitie and stearie acids), unsaturated carboxylic acids (such as elatic and oleic acids), 1-adamantanecarboxylic acid, n-alkylphosphonic acids (such as n -hexyiphosphonic, n-octylphosphonic, n-decylphosphonic, n-tetradecylphosphonic and n -octadacyiphosphonic acids), primary alkyl amines (such as octylamine, dodecylamine, hexadecylamine, octadecylamine and oleyl amine), secondary alkyl amines (such as dioctylamine), tertiary alkylamines (such as trioctylamine), alkyl phosphines (such as tri -n-octylphosphine and tri-n-butylphosphine), alkyl phosphine oxides (such as ti-n -octyiphosphine), fluorinated fatty carboxylic acids, fluorinated alkyl phosphines, functionalized polymers (such as poly( 1 -vinylpyrrolidone)-graft-( 1 -hexadecene)).

Of these, aliphatic carboxylic acids such as oleic acid are highly preferred in the present invention.

Optimally, the stabilizer comprises a mixture of a carboxylic acid and a primary alkyl amine.

The amount of surfactant added to the reaction vessel may vary and is not believed to be critical to the present invention so as long as a sufficient amount of surfactant is employed which can serve as a passivation layer for the subsequently formed IV-VI nanoparticles. The term "passivation layer" is used in the present invention to denote a media in which the surface of the nanoparticles is covered by a monolayer of amphiphilic species which ideally help to passivate dangling bonds at the surface and also provide a steric colloidal stabilization that prevents the particles from aggregating irreversibly. Typically, the surfactant is employed in the present invention in an amount to provide a ratio of surfactant to first precursor from about 1:2 to about 1:50. More specifically, the surfactant is employed in the present invention in an amount to provide a ratio of surfactant to first precursor from about 1:3 to about 1:6.

The mixture containing at least the organic solvent and first precursor is then heated to a temperature from about 90° C. to about 220° C. More preferably, the mixture containing at least the organic solvent and first precursor is then heated to a temperature from about 90° C. to about 170° C.

After heating the mixture, a second precursor that is different from the first precursor is added to the heated mixture (including the at least one surfactant). The second precursor can be either a molecular precursor of a Group IV element or a molecular precursor of a Group VI element depending on whichever is not used as the first precursor. In a preferred embodiment, the second precursor is a molecular precursor of a Group VI element. More preferably, the second precursor is a molecular precursor that contains Se. If needed, additional surfactant, which can be the same or different compound from the one previously used, can be introduced during this step of the present invention or after.

The addition of the second precursor to the heated mixture may occur using a single injection, or the second precursor may be added dropwise. Since the second precursor is introduced at nominal room temperature, a slight drop in the temperature of the heated mixture may occur. Upon addition of the second precursor to the heated mixture and subsequent mixing, a reaction mixture containing IV-VI nanocrystals begins to form. The nanocrystals are not dissolved by the organic solvent and are typically suspended within the passivation layer created by the surfactant. The presence of the stabilizing molecules tends to speed up the rate in which the nanoparticles are produced.

As indicated above, the addition of the second precursor to the heated mixture containing at least the organic solvent and the first precursor is performed in the presence of stirring, i.e., mixing. Mixing is employed at this stage of the present invention to cause nucleation of the IV-VI nanocrystals. The speed of the mixing may vary depending on the size of the reaction vessel as well as the amount of reactants used. Typically, and for a batch reactor, the mixing is performed at a speed of about 200 to about 2000 rpm, with a speed of about 500 to about 1500 rpm being more typical.

Mixing of the reaction mixture typically is carried out for a time period from about 1 minute to about 30 minutes, with a time period from about 5 to about 20 minutes being more typical. During the mixing step, the temperature of the reaction mixture containing the nanocrystals is controlled so as to provide substantially monodispersed IVA-VIA nanoparticles having a diameter of about 20 nm or less. Specifically, substantially monodispersed IVA-VIA nanoparticles having a diameter of about 20 nm or less can be obtained by controlling the temperature within a temperature range from about 90° C. to about 220° C. More preferably, nanoparticles having a size of about 10 nm or less can be achieved by controlling the temperature at this stage of the reaction at a temperature between about 90° C. to about 170° C.

After forming the nanoparticles, the nanoparticles are purified and recovered using techniques that are well known to those skilled in the art. For example, the nanoparticles can be purified by washing in a solvent/non-solvent pair such as hexane/methanol. After washing, the nanoparticles can be recovered from the solution by centrifugation.

The nanocrystals isolated from this synthesis all display a rock-salt crystals structure and appear to be free of planar defects (stacking faults or twin boundaries). The control of the synthesis yields particles with mean diameters from about 2 to about 20 nm. The particles having mean diameters from about 2 to about 7 nm closely resemble a sphere, while the particles having mean diameters from about 7 to about 11 nm display a truncated cubo-octahedral shape. Moreover, the particles having mean diameters from about 11 to about 20 nm are nearly cubic in their shape. In addition to the spherical and cubic morphologies, the addition of primary amines during the growth and at temperatures at the high end of the growth range (i.e., 180° to 220° C.) promotes nanoparticles with shapes approximating octahedral and six sided stars where the volume of the octahedral and stars are substantially equivalent to the volume of the spheres with diameters tunable from about 2 to about 20 nm.

In the following example, various Pb chalcogenide nanoparticles were synthesized to illustrate the synthetic procedure of the present invention as well as to show the characteristics of the nanoparticles that are produced therefrom.

All manipulations were carried out under standard airless condition, unless otherwise stated. All chemicals were used without further purification. Tri-n-octyl phosphine [TOP], Oxygen free, 99.999% selenium shot were purchased from Alfa. Lead acetate trihydrate and polyvinyl butyral were purchased from Aldrich. Anhydrous methanol, 1-butanol, ethanol, toluene, tetrachloroethylene were purchased from a variety of sources. Approximate masses of selenium were dissolved directly into the sufficient TOP to produce 1.0 M stock solutions of trioctylphosphine selenide [TOPSe].

EXAMPLE

Synthesis and Characteristization of Pb Chalcogenide Nanoparticles 1.421 g of lead acetate trihydrate (or lead oxide (PbO)) and 5 ml oleic acid were added into a reaction vessel containing 20 ml diphenyl ether solution and heated to a temperature of about 150° C. for 30 min to form a lead oleate. After cooling to 60° C., this solution was mixed with 12 ml TOPSe (or TOPTe) stock solution to prepare injecting precursor. Reaction was carried out at various injecting and reaction temperatures. Also various molar ratio of lead oleate to TOPSe stock solutions were tested for injecting precursor to find the optimum conditions of reaction. Typically, injecting the precursor solution at 130° C. of 30 ml diphenylether solution and keeping the reaction temperature at 110° C. for 5 min yielded approximately 5 nm sphere PbSe quantum dots. For the synthesis of larger size (>10 nm) cubic shape PbSe dots, lower injecting temperatures (<110° C.) or second injection of additional precursors at about 30% the amount of that in the first injection after the nucleation have been used were used After cooling to room temperature, all particles were isolated and purified. All detailed procedures for isolation and purification were described elsewhere. Purified particles were dispersed into the hexane, chloroform, toluene and various non-polar solvent. Size-selective precipitation was carried out using the literature method.

Figure 1D:
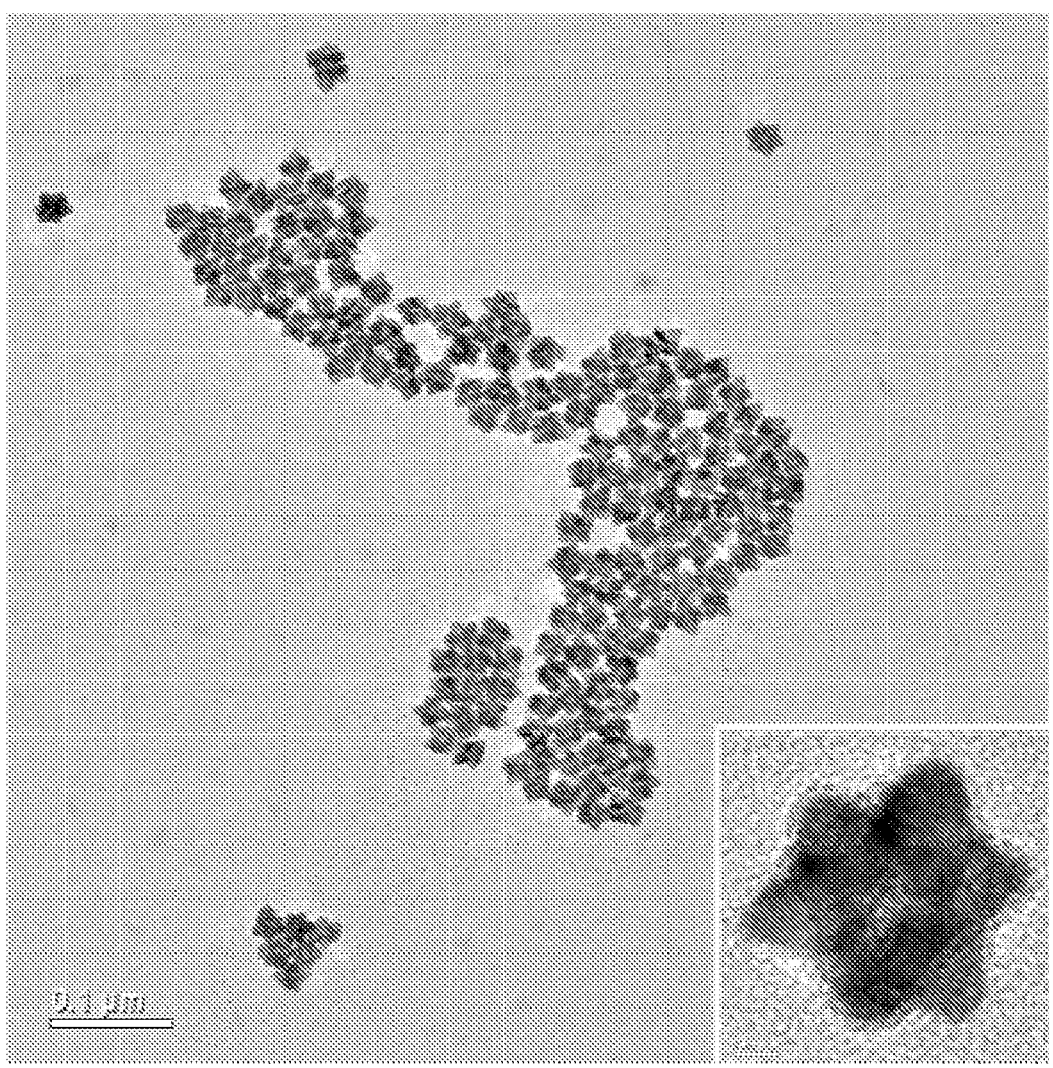

The PbSe nanoparticles produced above were characterized with transmission electron microscopy (TEM). The purified particles were dispersed in hexane or dibutylether and than spread on an amorphous carbon coated copper grid. FIGS. 1A–1D shows a micrograph of a sample of spherical particles (FIG. 1A), cubic particles (FIG. 1B), octahedral particles (FIG. 1C) and star-shaped particles (FIG. 1D). The particles are highly crystalline as can be seen for the lattice image in the inset. FIGS. 1A–1D could be fully indexed in accordance with the cubic rock salt structure of bulk PbSe. The different gray shades of the particles in the bright field TEM images result from different diffraction contrast of the individual particles as the crystal axis of the crystallites are oriented different in respect to the incident electron beam. Imaging in the dark field mode where only the diffracted electrons are collected shows that the brightness of each particle is inverse proportional to the contrast of the bright field image.

Figure 2A:
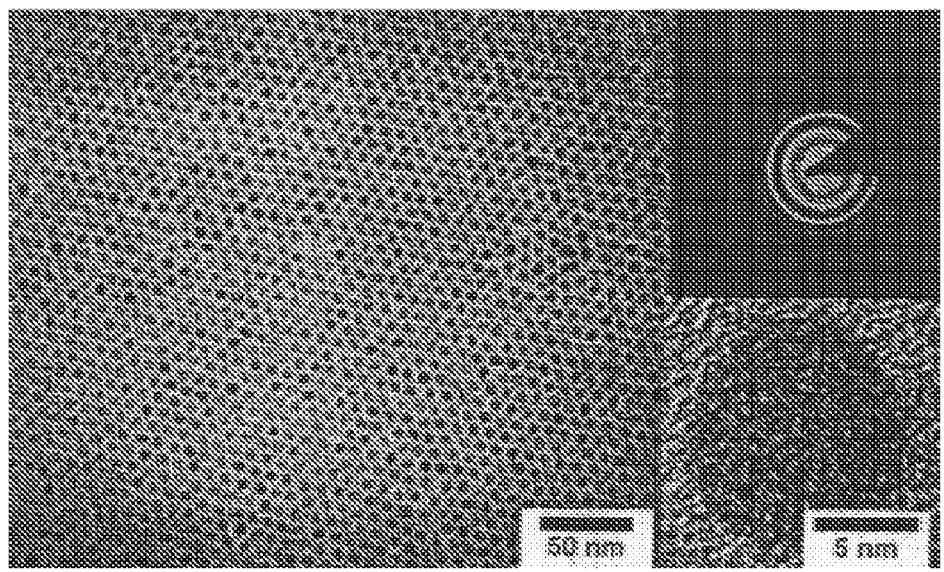
FIGS. 2A–2B are small angle X-ray scattering micrographs of the PbSe nanoparticles of the present invention showing different crystal shapes of the nanoparticles.
Figure 2B:
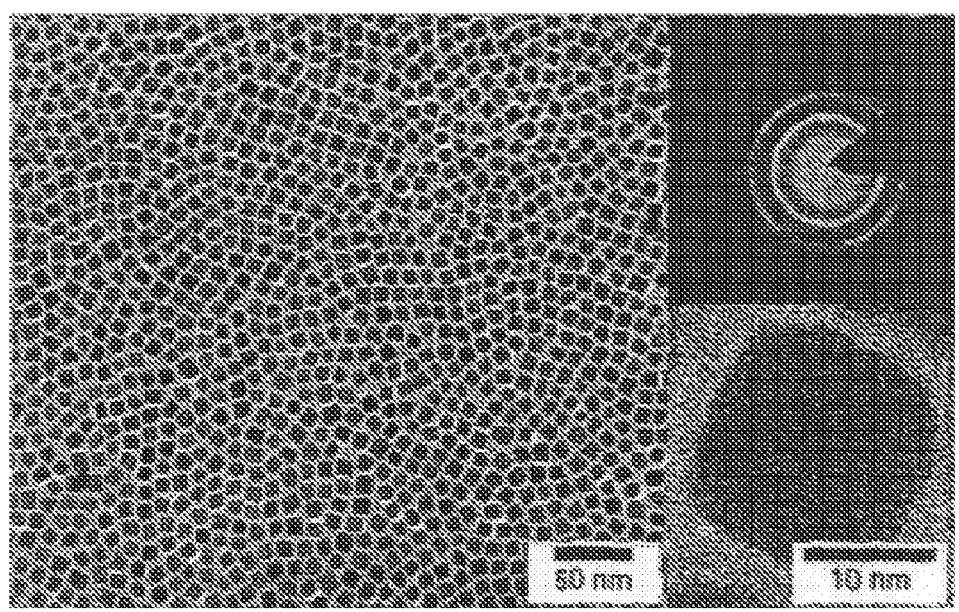

Two different crystal morphologies were found depending on the size of the nanocrystallites. FIG. 2A displays a sample with a mean diameter of 7.9 nm (=7%) and spherical morphology, while the larger particles (12 nm) in FIG. 2B have a cubic shape. PbSe nanocrystallites grown, as described above, show a distinct change in shape from spherical to cubic in the range of 9 to 11 nm. The cubic morphology of the larger PbSe nanocrystals reflects the internal structure of PbSe. The surface of the inorganic PbSe core is formed by the (100) and its symmetry equivalent planes.

The observed shape of the cubic particles can be explained with surface energy considerations. If a sufficient large crystal is in its thermodynamic equilibrium, crystallography planes with the lowest energy build its boundaries which are usually the low index planes (J. C. Heyraud, J. J. Metois, *Surface Sci.* 128, 334 (1983), Z. L. Wang, *J. Phys. Chem. B* 104, 1153 (2000)). In the case of the rock salt structure the lowest energy planes are the observed (100) planes.

Figure 3A:
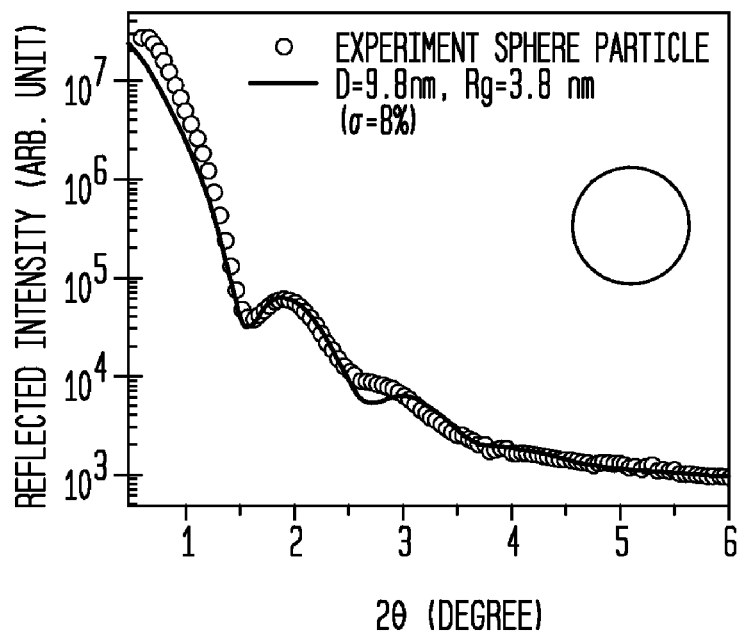
FIGS. 3A–3B are plots of reflected intensity (arbitrary "arb." units) vs. 2θ of the nanoparticles of the present invention (solid line) and an experimental shaped particle (open circle)
Figure 3B:
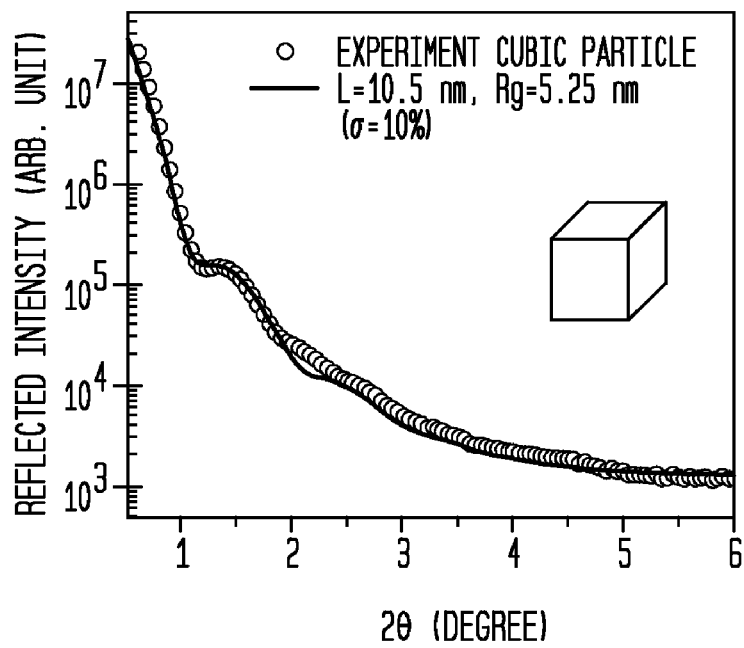

FIGS. 3A–3B show the small angle part of the XRD pattern of quantum spheres (FIG. 3A) and cubes (FIG. 3B). Strong and sharp reflections indicates the narrow size distribution and the pattern support a fcc packing of cubes and a simple cubic packing of spheres in accordance with the results from TEM.

In very small crystallites, the fraction of atoms building edges and vertices with high energy becomes significant and has to take into account. Crystallites with less than 2000 atoms, which corresponds to PbSe spheres smaller than 5 nm, try to avoid edges and vertices by forming a spheroid, polyhedron particle (S.-W. Wang, L. M. Falicov, A. W. Searcy, *Surf Sci.* 143, 609 (1984)). Nevertheless the nearly spherical morphology of the 8 nm PbSe nanocrystals (4000 atoms) is not the lowest energy shape. This was shown by annealing of an isolated and purified sample under zero growth conditions. A sample of spherical particles deposited on a TEM grid was heated for 30 min at 350° C. under an atmosphere of nitrogen, which results in a change of morphology from spherical to cubic (It was assumed the lowest energy shape of a particles grown in solution at 150° C. and annealed at 350° C. under an atmosphere of nitrogen was the same.). Therefore, the kinetic of the crystal growth has to be responsible for the spherical shape.

To obtain information on the growth process, the concentration of $Pb^{2+}$ ions in solution was determined and high values were observed during the growth period (Determined as PbS by reaction with an efficient sulfide source (bis(trimethylsilyl) thiane)). The observed growth of PbSe nanoparticles up to a size of 7 nm is due to reaction of lead and selenium precursors on the growth surface from the nutrient solution and not due to Ostwald ripening (A. L. Smith, *Particle Growth in Suspension* (Academic Press, London 1973), pp. 3–15.), the dissolution of smaller particles in benefit to the growth of larger ones. By taking advantage of Ostwald ripening as a growth mechanism near the thermodynamic equilibrium we were able to control the shape of the nanocrystals. 8 nm cubes were grown from 6 nm spherical particles by heating the isolated and purified spherical sample in solution with oleic acid and trioctylphosphine but no additional precursor molecules was added.

Figure 4:
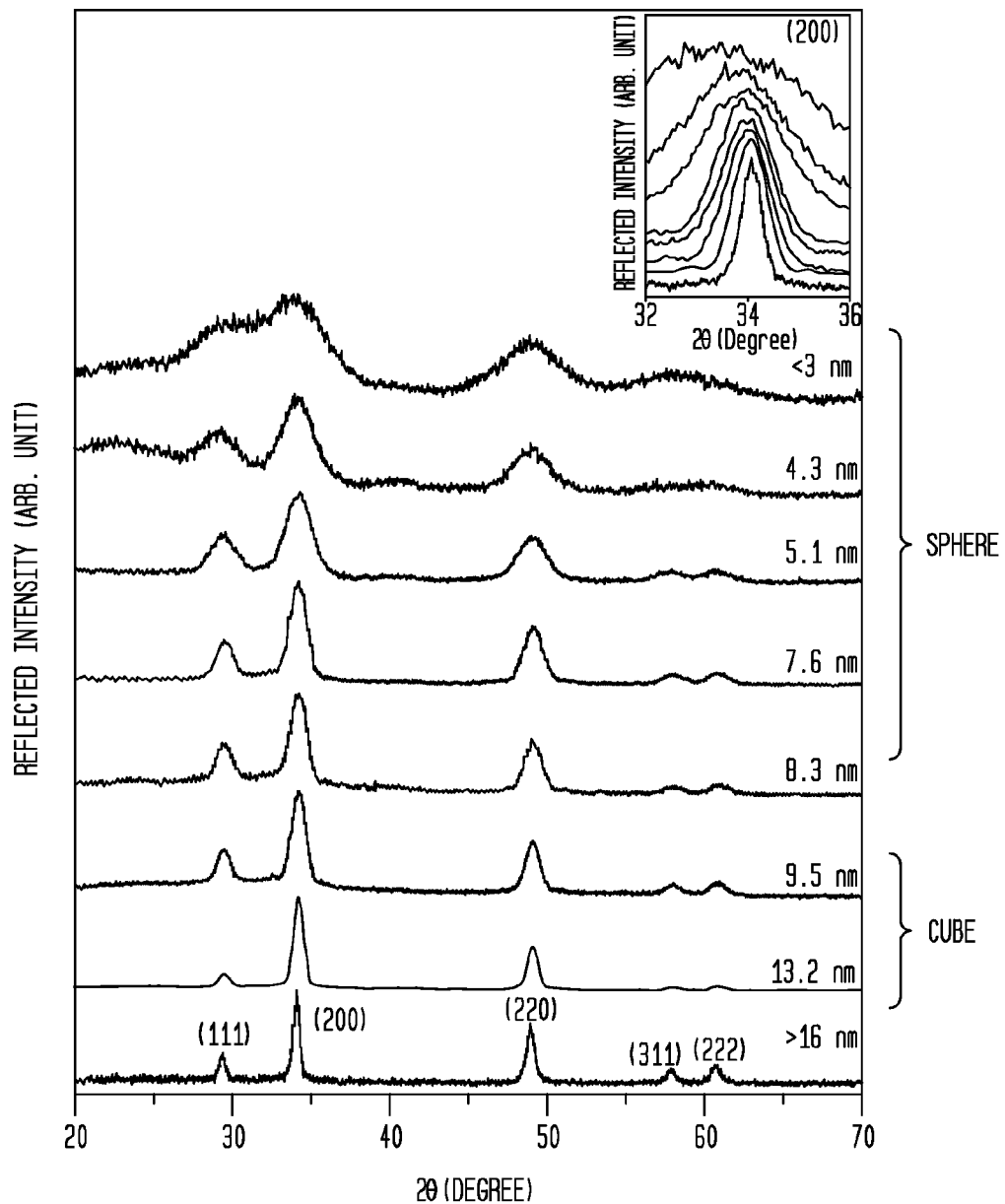
FIG. 4 is a plot of reflected intensity (arb. units) vs. 2θ for PbSe nanoparticles of the present invention having different shapes and sizes.

Lead chalcogenides provide important optical and electronic properties like a low band gap, high static dielectric constant and high charge charier mobility for infrared, laser and thermoelectric applications. FIG. 4 shows the size dependent absorption and photoluminescence spectra of the quantum dots in solution at room temperature. The spectra show several distinct peaks in the near infra red which is shifted to the blue in respect to the bulk material. These are direct consequences of quantum confinement. The energy of the optically excited states depends strongly on the size of the quantum dots. The position of the first absorption peak is shifted from 1130 nm for a sample 3.9 nm in diameter to about 2500 nm for a 10.2 nm sample of quantum cubes. These results agree well with data from PbSe nanocrystals grown in a glass matrix (A. Lipovskii et al., *Appl. Phys. Lett.* 71, 3406 (1997)). Upon excitation at 550 nm, strong band edge emission was observed. A positive temperature coefficient for the energy of the band gap (dE/dT>0) is found (A. Olkhovets, R. C. Hsu, A. Lipovskii, F. W. Wise, *Phys. Rev. Lett.* 81, 3539 (1998)).

Figure 5A:
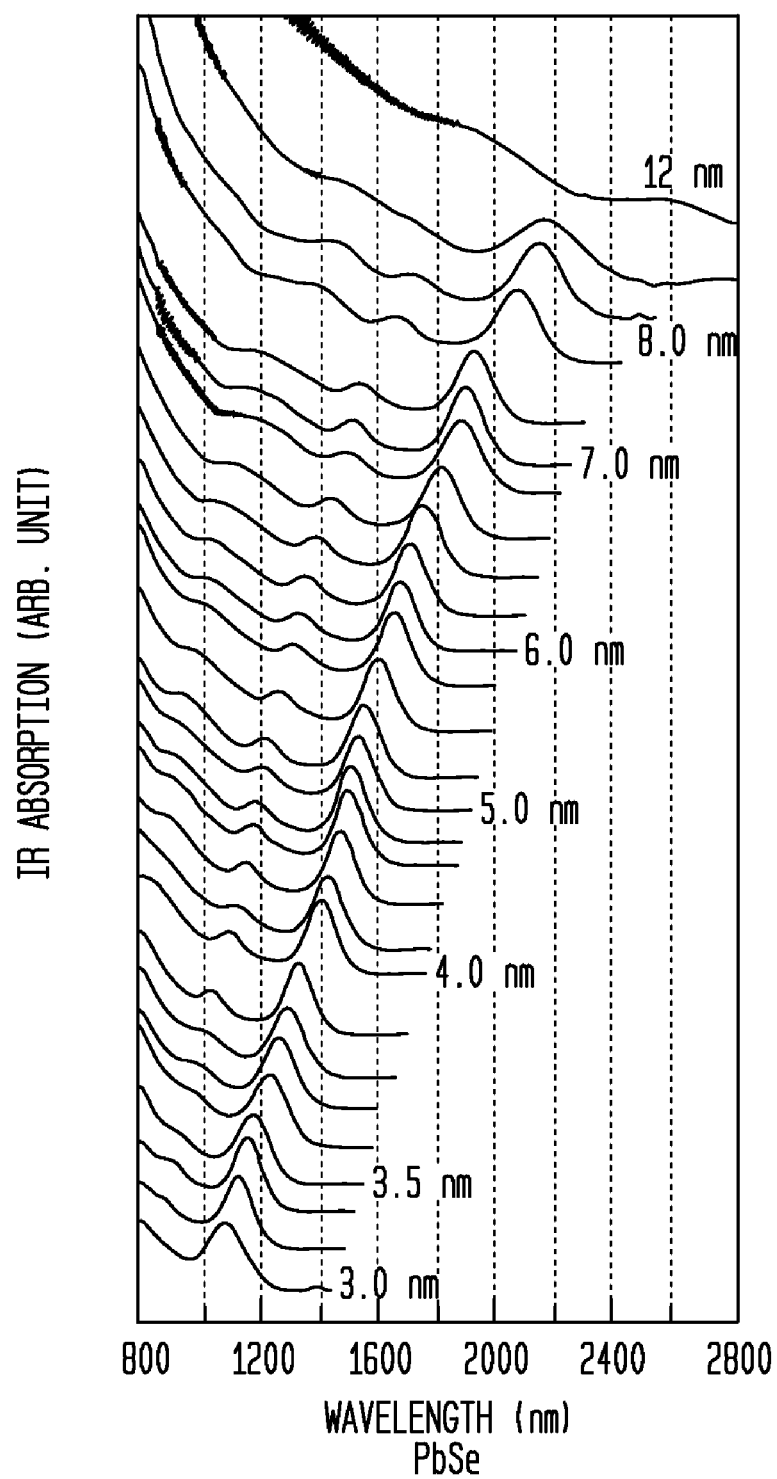
FIGS. 5A–5C are IR absorption curves of PbSe (FIG. 5A), PbS (FIG. 5B) and PbTe (FIG. 5C) nanoparticles of different sizes that were prepared using the synthetic procedure of the present invention.
Figure 5B:
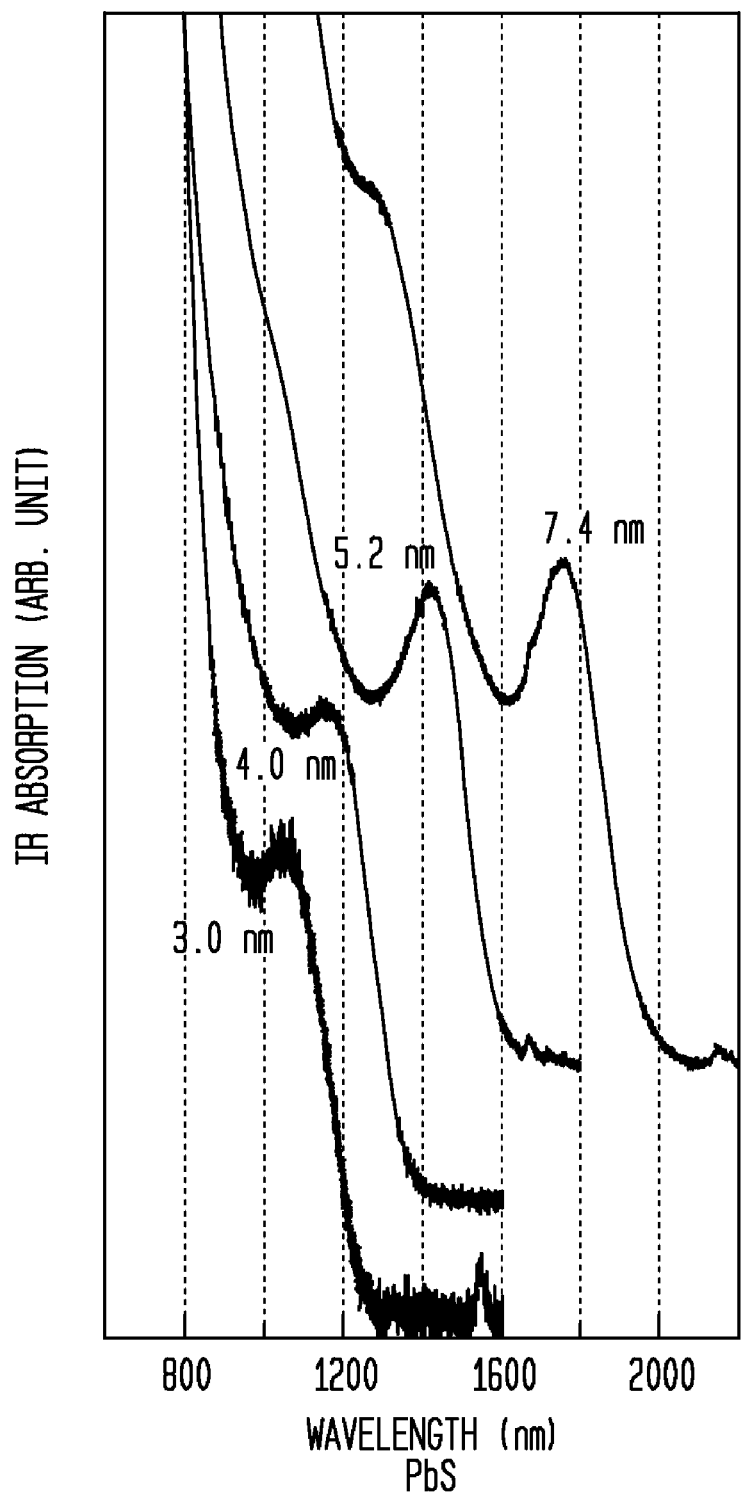
Figure 5C:
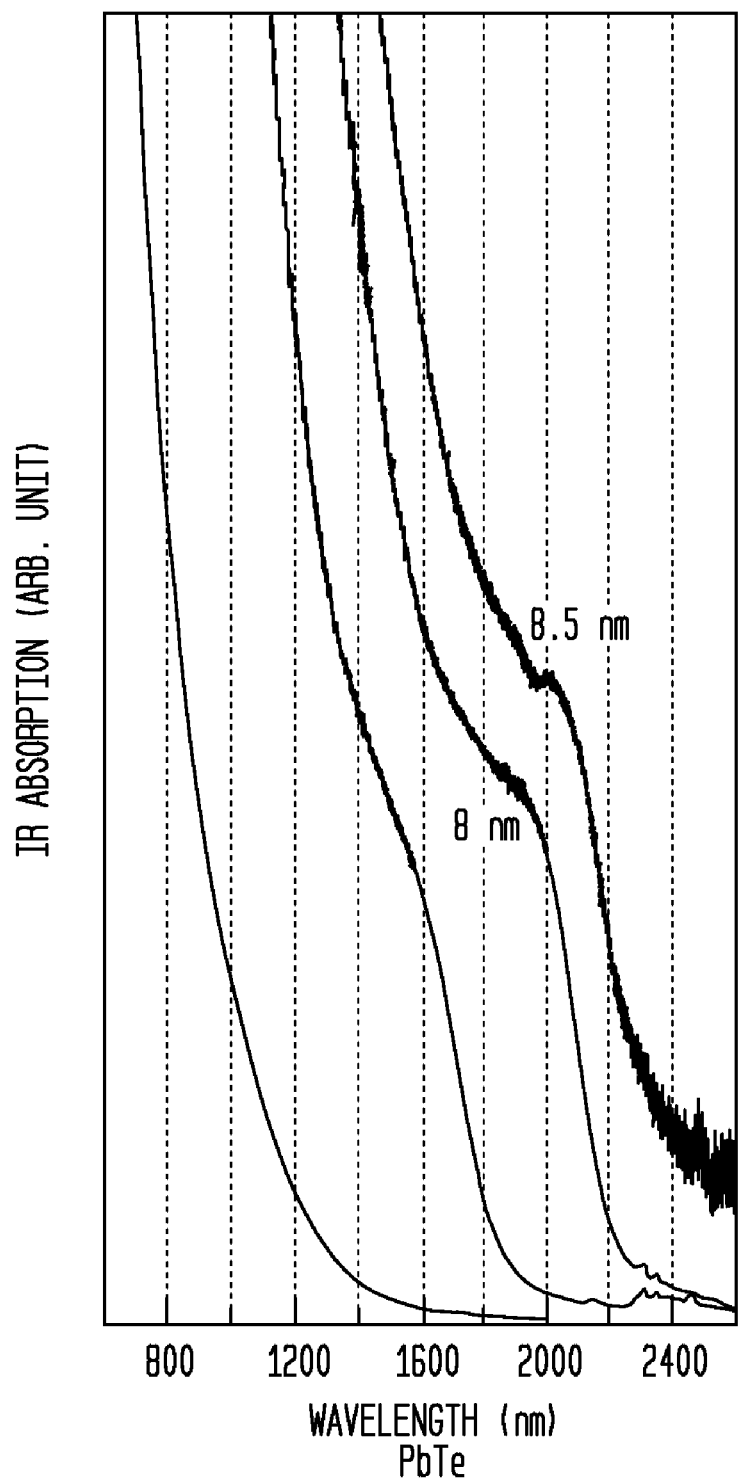

FIGS. 5A–5C are IR absorption curves of PbSe, PbS and PbTe nanoparticles of different sizes that were prepared using the procedure of the present invention. The tunable optical absorption and emission based on adjustment of size. These curves demonstrate that the absorption of the particles can be broadly tuned through the manipulation of particle size or by the choice of the anion (S, Se, Te). In addition, the optical absorption is a measure of the band-gap of the materials demonstrating that the electronic levels are being adjusted through changes in size. The modulation of the electronic energy levels will effect electronic transport in solids formed in whole or in part from these particles.

While the present invention has been particularly shown and described with respect to preferred embodiments thereof, it will be understood by those skilled in the art that the foregoing and other changes in forms and details may be made without departing from the scope and spirit of the present invention. It is therefore intended that the present invention not be limited to the exact forms and details described and illustrated, but fall within the scope of the appended claims.

Having thus described our invention in detail, what we claim as new and desire to secure by the Letters Patent is:

1. A method of forming IV-VI nanoparticles comprising;
   introducing, in the presence of at least one surfactant, a first precursor selected from the group consisting of a molecular precursor of a Group IV element and a molecular precursor of a Group VI element into a reaction vessel that comprises at least an organic solvent to form a mixture;
   heating the mixture to a temperature of about 90° C. or above;
   adding, in the presence of said at least one surfactant, a second precursor which is different from the first precursor and is selected from the group consisting of a molecular precursor of a Group IV element and a molecular precursor of a Group VI element into the heated mixture;
   mixing the mixture to initiate nucleation of IV-VI nanocrystals; and
   controlling the temperature of the nanocrystals to provide substantially monodispersed IV-VI nanoparticles having a diameter of about 20 nm or less.

2. The method of claim 1 wherein the first precursor is a molecular precursor of a Group IV element, and the second precursor is a molecular precursor of a Group VI element.

3. The method of claim 2 wherein the molecular precursor of the Group IV element comprises Pb, and the molecular precursor of the Group VI element comprises S, Se, Te or a mixture thereof.

4. The method of claim 3 wherein the molecular precursor of the Group VI element comprises Se.

5. The method of claim 1 wherein the first precursor is a molecular precursor of a Group VI element, and the second precursor is a molecular precursor of a Group IV element.

6. The method of claim 5 wherein the molecular precursor of the Group IV element comprises Pb, and the molecular precursor of the Group VI element comprises S, Se, Te or a mixture thereof.

7. The method of claim 3 wherein the molecular precursor of the Group VI element comprises Se.

8. The method of claim 1 wherein said forming is performed at a water content of less than 0.5%.

9. The method of claim 8 wherein said water content is about 0.1% or below.

10. The method of claim 1 wherein the at least one surfactant comprises an aliphatic carboxylic acid having from about 1 to about 22 carbon atoms, a fatty carboxylic acid, an unsaturated carboxylic acid, a 1-adamantan-ecacboxylic acid, an n-alkylphosphonic acid, a primary alkyl amine, a secondary alkyl amine, a tertiary alkylamine, an alkyl phosphine, an alkyl phosphine oxide, a fluorinated fatty carboxylic acid, a fluorinated alkyl phosphine, or a functionalized polymer.

11. The method of claim 1 wherein the at least one surfactant is an aliphatic carboxylic acid and optionally a primary amine.

12. The method of claim 1 wherein the temperature of the heating is from about 90° C. to about 220° C.

13. The method of claim 1 wherein the mixing is performed at a speed from about 200 to 2000 rpm in a batch reactor.

14. The method of claim 1 wherein the temperature of the controlling step is from about 90° C. to about 220° C.

15. The method of claim 1 wherein the temperature of the controlling step is from about 90° C. to about 170° C. and said nanoparticles have a size of about 10 nm or less.

16. The method of claim 1 wherein the nanoparticles are purified and recovered.

17. The method of claim 1 wherein the nanoparticles are spherical, cubic, octahedral, star-shaped or a mixture thereof.

18. A method of forming Pb-chalcogenide nanoparticles comprising;
introducing a salt of a lead compound into a reaction vessel that comprises at least an organic solvent to form a mixture;
adding at least one surfactant to the mixture;
heating the mixture to a temperature of about 90° C. or above;
adding a precursor of chalcogenide into the heated mixture;
mixing the mixture to initiate nucleation of Pb-chalcogenide nanocrystals; and
controlling the temperature of the nanocrystals to provide substantially monodispersed Pb-chalcogenide nanoparticles having a diameter of about 20 nm or less.

19. The method of claim 18 wherein the chalcogenide is S, Se, Te or a mixture thereof.

20. The method of claim 19 wherein the chalcogenide is Se.

21. The method of claim 18 wherein said forming is performed at a water content of less than 0.5%.

22. The method of claim 21 wherein said water content is about 0.1% or below.

23. The method of claim 18 wherein the at least one surfactant comprises an aliphatic carboxylic acid having from about 1 to about 22 carbon atoms, a fatty carboxylic acid, an unsaturated carboxylic acid, a 1-adamantan-ecacboxylic acid, an n-alkylphosphonic acid, a primary alkyl amine, a secondary alkyl amine, a tertiary alkylamine, an alkyl phosphine, an alkyl phosphine oxide, a fluorinated fatty carboxylic acid, a fluorinated alkyl phosphine, or a functionalized polymer.

24. The method of claim 18 wherein the at least one surfactant is an aliphatic carboxylic acid and a primary amine.

25. The method of claim 18 wherein the temperature of the heating is from about 90° C. to about 220° C.

26. The method of claim 18 wherein the mixing is performed at a speed from about 200 to 2000 rpm in a batch reactor.

27. The method of claim 18 wherein the temperature of the controlling step is from about 90° C. to about 220° C.

28. The method of claim 18 wherein the temperature of the controlling step is from about 90° C. to about 170° C. and said nanoparticles have a size of about 10 nm or less.

29. The method of claim 18 wherein the nanoparticles are purified and recovered.

30. The method of claim 18 wherein the nanoparticles are spherical, cubic, octahedral, star-shaped or a mixture thereof.

* * * * *